US005486404A

United States Patent [19]

Nakajima et al.

[11] Patent Number: 5,486,404

[45] Date of Patent: Jan. 23, 1996

[54] NANO-CRYSTALLINE SOFT MAGNETIC ALLOY RIBBON WITH INSULATION COATING AND MAGNETIC CORE MADE THEREFROM AND PULSE GENERATOR, LASER UNIT AND ACCELERATOR THEREWITH

[75] Inventors: Shin Nakajima, Kumagaya; Michiyuki Fukushima; Noriyoshi Hirao, both of Saitama, all of Japan

[73] Assignee: Hitachi Metals, Ltd., Tokyo, Japan

[21] Appl. No.: 246,429

[22] Filed: May 20, 1994

[30] Foreign Application Priority Data

May 21, 1993 [JP] Japan .................................... 5-119548

[51] Int. Cl.[6] .......................................................... B32B 3/00

[52] U.S. Cl. .......................... 428/172; 428/143; 428/192; 428/208; 428/209; 428/210; 428/212; 428/213; 428/332; 428/693; 428/697; 428/900

[58] Field of Search .................................... 428/172, 212, 428/910, 141, 143, 210, 208, 209, 192, 213, 312, 692, 693, 697, 694 R; 359/280

[56] References Cited

U.S. PATENT DOCUMENTS

| | | | |
|---|---|---|---|
| 4,833,019 | 5/1989 | Sunarnasarn | 428/336 |
| 4,837,082 | 6/1989 | Harrell et al. | 428/329 |
| 4,839,244 | 6/1989 | Tsutamoto | 428/900 |

FOREIGN PATENT DOCUMENTS

| | | | |
|---|---|---|---|
| 0337716 | 10/1989 | European Pat. Off. . | |
| 400299A1 | 8/1990 | Germany . | |
| 59-004109 | 1/1984 | Japan . | |
| 63-302504 | 12/1988 | Japan | H01F 1/14 |
| 2297903 | 12/1990 | Japan | H01F 1/18 |
| 320444 | 1/1991 | Japan | C22C 38/00 |

OTHER PUBLICATIONS

Journal of Applied Physics, vol. 67, No. 9, May 1, 1990, New York, US, pp. 5556–5561, "Applications of Amorphous Magnetic Materials at Very–High Magnetization Rates (Invited)".

*Primary Examiner*—Donald J. Loney
*Attorney, Agent, or Firm*—Sughrue, Mion, Zinn, Macpeak & Seas

[57] ABSTRACT

A nano-crystalline soft magnetic alloy ribbon having a structure being occupied by nano-crystalline particles having an average particle size of 50 nm or less at least 50% of the alloy structure. A ceramic insulation coating is formed on its surface so that the coating becomes thicker at the both ends of the ribbon than at the center in the transverse direction of the ribbon and the thickness dx at the coating ends and the average thickness da of the coating determined by a mass measurement method are in the relations of 1.2 da≦dx≦5 da and dx≦10 μm. With a magnetic core using such a nano-crystalline soft magnetic alloy ribbon, magnetic components including saturable reactor, transformer, saturable transformer, acceleration cavity and surge absorbing elements such as surge block core in neutral beam injector can realize a higher performance. The invention also results in a higher reliability for the devices using such magnetic components.

13 Claims, 1 Drawing Sheet

NANO-CRYSTALLINE SOFT MAGNETIC ALLOY RIBBON WITH INSULATION COATING AND MAGNETIC CORE MADE THEREFROM AND PULSE GENERATOR, LASER UNIT AND ACCELERATOR THEREWITH

FIELD OF THE INVENTION

The present invention relates to soft magnetic alloy ribbons and magnetic cores comprising such ribbons, and further relates to pulse generators, laser units and accelerators using such magnetic cores. The magnetic cores are used in magnetic components which operate at magnetization speed $\Delta B/\tau$ of about 0.1 to 100 T/μs where $\Delta B$ is defined as the magnetic flux density swing and $\tau$, the period during which $\Delta B$ changes from 10 to 90%. The examples of such magnetic components are saturable reactors, saturable transformers, or transformers used in high voltage pulse generators for laser units including excimer laser, TEA (Transversely Excited Atmospheric)-$CO_2$ laser, TEMA (Transversely Excited Multi-Atmospheric)-$CO_2$ laser or copper vapor laser and are surge absorbing elements such as a surge block cores in neutral beam injectors.

BACKGROUND OF THE INVENTION

Laser units including excimer laser, TEA-$CO_2$ laser, TEMA-$CO_2$ laser or copper vapor laser as well as accelerators such as a linear induction accelerator generally incorporate a high repetition rate high voltage pulse generators, in which the energy stored in a capacitor is discharged with a discharge tube such as a thyratron or a semiconductor switching device such as a thyristor.

For improving the output power, repetition frequency, efficiency and reliability of such high voltage pulse generators, it is important to reduce losses at above switching devices. For this purpose, magnetic components such as a step-up transformer, a saturable transformer and a saturable reactor are used.

The above linear induction accelerator incorporates an acceleration cavity utilizing a magnetic core for generation or acceleration of charged particle beam such as electron beam.

The ion sources in a neutral beam injector comprise magnetic components to suppress surge voltage.

For the magnetic components used for these applications, it is important to reduce magnetic core volume and core loss. It is well known that the magnetic core volume and the core loss are in inverse proportion to the square of the effective magnetic flux density swing $\Delta B$, when the temperature rise at the magnetic core caused by the core loss is ignored. If the reset magnetizing force is large enough, the magnetic flux density swing$\Delta B$ is about twice of the effective magnetic flux density Bms. Thus, it is preferable to use a magnetic core made of Fe-based soft magnetic alloy with high saturation magnetic flux density.

In the aforementioned applications of magnetic components, the magnetization speed $\Delta B/\tau$ reaches to 0.1 to 100 T/μs. In case that the temperature rise at the magnetic core due to eddy current loss cannot be ignored when a material with low electric resistivity such as Fe-based soft magnetic alloy is used, insulation oil or insulation gas is usually used to suppress the temperature rise of the magnetic core to a practically allowable temperature. If, however, the eddy current loss of the magnetic core is too large, the temperature rise of the magnetic core cannot be sufficiently suppressed and the efficiency of the unit is largely spoiled.

There are two methods to obtain a magnetic core with low eddy current loss using soft magnetic alloy: One is to use ribbons of soft magnetic alloy to form a toroidal core or a stacked magnetic core; the other is to use powder of soft magnetic alloy to be formed into a magnetic core under pressure. However, the latter magnetic core generally has a relative permeability of as low as several hundreds or less. Accordingly, the former magnetic cores with soft magnetic alloy ribbons are mainly used for the applications of this invention.

It is known that, for lower eddy current loss, the magnetic core needs to be comprised with thin soft magnetic alloy ribbons with high resistivity and to have insulation coating formed on their surface.

Various toroidal magnetic cores have been used for this purpose: toroidal cores comprising heat-treated Fe-based amorphous soft magnetic alloy ribbons and insulation films such as polyethylene Terephthalate films wound together, the cores formed with the above soft magnetic alloy ribbons and polyimide films wound together and then heat-treated, the cores comprising the heat-treated soft magnetic alloy ribbons on which Polyimide insulation films are formed before winding, or the cores made of the soft magnetic alloy ribbons having ceramic insulation coating comprising $Al_2O_3$, $SiO_2$ or MgO on the surface.

However, the saturation magnetostriction constant of the Fe-based amorphous soft magnetic alloy ribbons are as large as about $20\times10^{-6}$ or more. Therefore, unless the ribbons are provided with MgO or colloidal silica insulation coating of about 0.3 μm thick applied or $SiO_2$ insulation coating by deposition method of about 0.2 μm thick formed on the surface, the effective magnetic flux density Bms or the effective residual magnetic flux density Brms in the direct current magnetic characteristics of the ribbon is deteriorated under the effect of the stress applied onto the ribbon during winding with insulation films or insulation coating formed on the ribbon surface.

On the other hand, the ribbons with about 0.3 μm thick insulation coating of MgO or colloidal silica and the ribbons with about 0.2 μm thick $SiO_2$ insulation coating by the deposition method are known to have insufficient insulation characteristic under the operation condition where the magnetization speed $\Delta B/\tau$ is about 0.1 to 100 T/μs.

If the above MgO or colloidal silica insulation coating is made thicker to improve the insulation characteristic, the bonding strength between the ribbons and the coating materials is reduced, which impedes stable performance in practical use of the core. Besides, for the $SiO_2$ insulation coating by the deposition method, thicker film for an improved insulation characteristic is not preferable from the viewpoint of production efficiency.

Japanese Patent Application Laid-Open No. 302504/1988 or No. 20444/1991 discloses a nano-crystalline soft magnetic alloy ribbon in contrast with above materials. According to these inventions, a ceramic insulation coating is formed onto an amorphous alloy ribbon, then the ribbon is heat treated at a temperature over its crystallization temperature, so that nano-crystalline particles having diameter of 50 nm or less represent at least 50% of the structure. The value of the saturation magnetostriction constant for such ribbon is smaller than that for an Fe-based amorphous soft magnetic alloy ribbon by one digit or more.

Thus, according to Japanese Patent Application Laid-open No. 297903/1990, toroidal magnetic cores with nano-crystalline soft magnetic alloy can be made by heating the cores and coated films comprising mixture of silanol oligomer and micro ceramic particles to form a ceramic insulation coating with cross-linked silanol oligomer serving for layer insulation. The above mentioned magnetic cores with ceramic insulation coating have almost the same direct current magnetic characteristics as the ribbon itself. Its core loss when operated at a magnetization speed $\Delta B/\tau$ of several tens of T/μs or more is known to be considerably smaller than that for the toroidal core with an insulation film formed on the Fe-based amorphous soft magnetic alloy ribbon.

However, the toroidal core as described above still have some drawbacks. Suppose a toroidal core formed by winding nano-crystalline soft magnetic alloy ribbons with the above $SiO_2$insulation coating thereon, which is heat treated at a temperature above the crystallization temperature of the ribbon under the direct current magnetic field of 800 A/m along its magnetic path direction. When such cores are subjected to the durability test where the cores are operated at a repetition rate of 500 Hz and for magnetic flux density swing $\Delta B$ of 2.5 T and magnetization speed $\Delta B/\tau$ of 50 T/μs (corresponding to 25 V for the inter-layer voltage), the loss at the magnetic core rapidly increases under application of pulse voltage for only about $10^5$ shots, because the core has only insufficient layer dielectric strength.

Magnetic cores used in laser units, accelerators or surge block cores usually operate at a magnetization speed $\tau B/\tau$ of about 0.1 to 100 T/μs. Assuming a soft magnetic alloy ribbon having a width W of 25 mm and a thickness t of 20 μm is used to form a toroidal core, which is operated for magnetic flux density swing $\Delta B$ of 2.5 T and at a magnetization speed $\Delta B/\tau$ of 50 T/μs, resulting in uniform induction of voltage for the layers of the ribbon constituting the toroidal core. In this case, the pulse height value Vp of the inter-layer voltage induced between layers of the toroidal core is 25 V/layer according to the formula (1).

$$\text{Formula: } Vp \geqq (W \cdot t \cdot \Delta B)/\tau \qquad (1)$$

The nano-crystalline soft magnetic alloy ribbons described here are manufactured by the rapid quenching method generally referred to as single roller method. And the toroidal core is formed by winding the ribbons with the insulation coating thereon and then heat-treated at a temperature above its crystallization temperature.

The ribbon manufactured by the single roller method as above generally has ten-point average roughness Rz of about 3 μm according to JIS B0601 on its surface. Because of the effect of the surface roughness, the dielectric strength of the insulation coating becomes lower. Considering such deterioration of the dielectric strength, the insulation coating should be formed so as to resist against the value determined from the above formula (1). Besides, unlike usual dielectric conditions, it must be taken into account that the electric field intensity at the edges of the magnetic ribbon ends becomes higher than at its center when the actual toroidal core is operated under large amplitude of the magnetic flux density.

In general, to realize a highly reliable pulse generator, laser unit or accelerator system, the magnetic components are required to have stable magnetic characteristics even after the severest operations where, at a magnetization speed $\Delta B/\tau$ of 50 T/μs, at least $10^5$ shots or more, or more preferably $10^9$ shots of pulse voltage is applied.

To attain magnetic cores whose change of the magnetic properties with time is limited to a ignorable level for practical use even after $10^6$ shots of pulse application or more at a magnetization speed $\Delta B/\tau$ of 50 T/μs, it is required to form an $SiO_2$ insulation coating having an average thickness of about 3 μm or more on the ribbon surface when the above nanocrystalline soft magnetic alloy ribbons having width W of 25 mm, thickness t of 20 μm and ten-point average roughness Rz of about 3 μm are used for the magnetic cores.

In case of the nano-crystalline soft magnetic alloy ribbons, the value of the saturation magnetostriction is small (order of $10^{-6}$) and their magnetic characteristics are less deteriorated under the effect of stress. However, when a ceramic insulation coating with an average thickness of about 3 μm, which amounts to 20% of the thickness of the ribbon, is formed on the surface, the effective magnetic flux density Bms or the effective residual magnetic flux density Brsm in the direct current magnetic characteristics may be lowered by the effect of the stress inevitably applied to time ribbon during insulation coating formation. Further, the relative permeability may be reduced and the core loss may increase during pulse voltage operation.

The nano-crystalline soft magnetic alloy ribbon is known to have a smaller volume in crystallized state than in amorphous state. If the insulation coating formed on the ribbon surface in amorphous state has an average thickness of about 3 μm, such reduction of volume causes cracks or other defects in the insulation coating and leads to reduced bonding strength with the ribbon, which may result in peeling off from the ribbon surface.

If a toroidal core with defects in the ceramic insulation coating or with a reduced bonding strength between the insulation coating and the ribbon is operated at a magnetization speed $\Delta B/\tau$ of about 0.1 T to 100 T/μs, the magnetostrictive vibration at the magnetic core generated in the operation promotes crack growth or peeling for the inter-layer insulation coating, which gradually reduces the inter-layer dielectric strength. This may cause a rapid change of magnetic characteristics of the core under the effect of pulse voltage of only about $10^5$ shots.

SUMMARY OF THE INVENTION

Nano-crystalline soft magnetic alloy ribbons according to the present invention are manufactured by forming a ceramic insulation film on an amorphous soft magnetic alloy ribbon and heating the ribbon and the insulation materials at a temperature above its crystallization temperature. Minute nano-crystalline particles having a diameter of 50 nm or less represent at least 50% of its structure. The ceramic insulation coating is thicker at the ends than at the center in the transverse direction of the ribbon. When the thickness of the ceramic insulation coating at the ends of the ribbon is defined as dx and the average thickness of the insulation coating by a mass measurement method is defined as da, $1.2\,da \leqq dx \leqq 5\,da$ and $dx \leqq 10$ μm are satisfied.

Provided that a nano-crystalline soft magnetic alloy ribbon where the average thickness t determined by a mass measurement method is $5\ \mu m \leqq t \leqq 30\ \mu m$, the width is W, the magnetic flux density swing is $\Delta B$, and the period where the above magnetic flux density swing $\Delta B$ changes from 10 to 90% is $\tau$, the average thickness da of the insulation coating is in the ranges satisfying $0.2\ \mu m \leqq da \leqq 4\ \mu m$ and $da \geqq (40 \times 10^{-9} \cdot \Delta B \cdot W \cdot t)/\tau$.

The above nano-crystalline soft magnetic alloy ribbon comprises Fe as the main constituent and further comprises, as essential constituents, at least either one of Cu and Au and at least one of Ti, V, Zr, Nb, Mo, Hf, Ta and W.

With a magnetic core manufactured with a nano-crystalline soft magnetic alloy ribbon having a ceramic insulation coating thereon according to the present invention, losses at magnetic components such as transformer, saturable reactor and saturable transformer can be reduced. In addition, the change of the insulation characteristics by the effect of magnetostrictive vibration caused with the pulse voltage can be suppressed. In result, a pulse generator, laser unit or accelerator incorporating above magnetic components can be made smaller in size and can operate with higher efficiency. This also enables continuous operation with high repetition rates and large output voltage as well as improved reliability of the devices, which have been considered difficult so far.

DETAILED DESCRIPTION OF THE INVENTION

Figure 1:
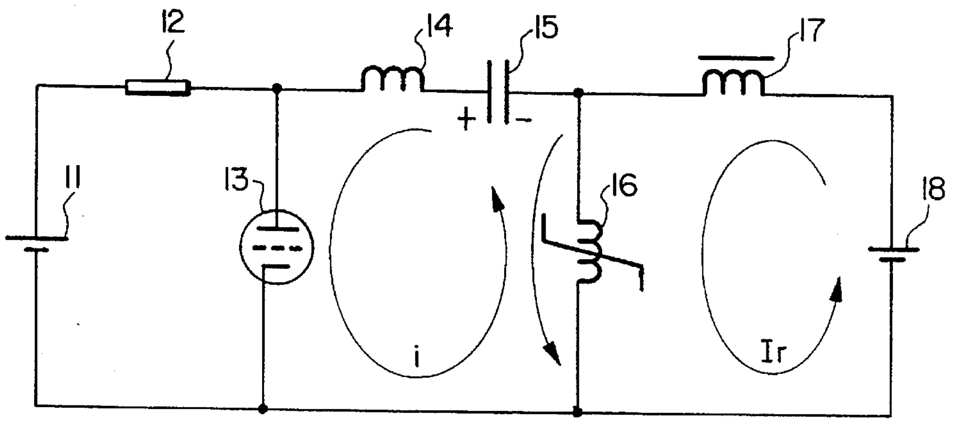
FIG. 1 is a schematic view to show the configuration of a circuit to measure the magnetic characteristics of a magnetic core for a saturable reactor during pulse operation.

A nano-crystalline soft magnetic alloy ribbon according to the present invention is manufactured by forming a ceramic insulation film on an amorphous soft magnetic alloy ribbon surface and then heating the ribbon at a temperature above its crystallization temperature. Nano-crystalline soft magnetic alloy ribbon has an alloy structure being occupied by nanocrystalline particles having an average particles size of 50 nm or less at least 50% of the structure. The ceramic insulation coating is formed to be thicker at the both ends than at the center in the transverse direction of the ribbon. When the thickness of the coating at the ribbon ends is dx and the average thickness of the coating determined by a mass measurement method is da, relations 1.2 da≦dx≦5 da and dx≦10 μm are satisfied.

Thus, by providing a thicker insulation coating at the ribbon ends than at the center in the transverse direction, the average thickness of the insulation coating can be made thinner, which can suppress deterioration of magnetic characteristics of the ribbon caused by insulation coating forming. In addition, such a coating assures a sufficient withstanding voltage characteristic even for the electric field generated at the edges of the insulation coating ends under the operation condition with a fast magnetization speed of $\Delta B/\tau$.

Thin average thickness of the insulation coating on the ribbon can suppress crack generation in the coating under the effect of stress and reduction of bonding strength between the coating and the ribbon surface which occurred when the volume of the amorphous soft magnetic alloy ribbon is reduced during the above heat treatment process. Thus, such a coating with thin average thickness is preferred because it suppresses the change of magnetic characteristics of the ribbon due to magnetostrictive vibration during operation at a fast magnetization speed $\Delta B/\tau$.

By making the maximum thickness dx of the coating formed on the ribbon surface 1.2 to 5 times the average thickness da of the coating determined by a mass measurement method, the change of the magnetic characteristics can be reduced even for a faster magnetization speed $\Delta B/\tau$, which assures a high reliability.

Suppose a nano-crystalline soft magnetic alloy ribbon provided an insulation coating on its surface, the average thickness t of the ribbon determined by a mass measurement method is 5≦t≦30 μm, the ribbon width is W, the magnetic flux density swing is ΔB, and the period where the above magnetic flux density swing ΔB changes from 10 to 90% is τ. If the average thickness da of the insulation coating is in the range satisfying 0.2 μm≦da≦4 μm and $da \geqq (40\times10^{-9}\cdot\Delta B\cdot W\cdot t)/\tau$, the ribbon can have excellent magnetic characteristics and long term stability.

The nano-crystalline soft magnetic alloy used in the present invention comprises Fe as the main constituent, at least either one of Cu and Au and at least one of Ti, V, Zr, Nb, Mo, Hf, Ta and W. Such additions improve the effective saturation magnetic flux density and lower the magnetostriction constant. Thus, deterioration of magnetic characteristics accompanying insulation coating forming can be minimized. This, accordingly, increases the effective magnetic flux density swing K·ΔB. which is the product of the packing factor K and the magnetic flux density swing ΔB, and decreases core loss coefficient $Pcg/(K\cdot\Delta B)^2$, which is obtained by dividing the core loss Pcg for a half cycle per unit volume by the square of the effective magnetic flux density swing K·ΔB. Thus, a small-sized magnetic core with a low loss can be obtained.

With magnetic components such as transformer, saturable reactor and saturable transformer using a magnetic core manufactured with the nano-crystalline soft magnetic alloy ribbons with a ceramic insulation coating thereon according to the present invention, a pulse generator laser unit or accelerator can be made smaller in size and can operate with higher efficiency because core losses can be reduced. In addition, the magnetic core can be suppressed the change of the insulation characteristics. This enables the devices to be operated continuously with high repetition rates and large output voltage, which have been considered difficult so far. At the same time, it also improves reliability of the devices.

EXAMPLE 1

Amorphous soft magnetic alloy ribbons were manufactured to have composition of $Fe_{73.5}Cu_1Nb_3Si_{13.5}B_9$, saturation magnetostriction constant τs of $+20\times10^{-6}$, width W of 25 mm, average thickness t of about 20 μm and ten-point average surface roughness Rz of about 3 μm by a single roller quenching method. Each ribbon was provided with one of six types of insulation coating in Table 1 on its surface. All of the insulation coating had an average thickness of about 2 μm according to the mass measurement method, and the ratios of their average thickness da as above to their maximum thickness dx at the ribbon ends in the transverse direction were in the range from 1.2 to 1.5.

A comparative sample A was an amorphous soft magnetic alloy ribbon without an insulation coating. Comparative samples B and C were amorphous soft magnetic alloy ribbons with insulation coating thereon and the ratios of the average thickness da to the maximum thickness dx as above were out of the range from 1.2 to 5. They are also shown in Table 1.

For each of samples No. 1 to 6 as well as comparative samples B and C, the insulation coating was formed by applying and drying the liquid made by mixing the oligomer of hydrolysis product obtained from methyltrimethoxysilane and minute colloidal $SiO_2$, diluting the mixture with isopropyl alcohol (IPA) and adding some NH3 on the surface.

TABLE 1

| | av. Thickness of Ribbons t(μm) | Surface Roughness Rz(μm) | av. Thickness of Coating da(μm) | Thickness at Coating Edges dx(μm) | dx/da |
|---|---|---|---|---|---|
| 1 | 20.2 | 3.2 | 1.9 | 3.1 | 1.6 |
| 2 | 20.3 | 2.9 | 2.0 | 4.2 | 2.1 |
| 3 | 19.9 | 2.7 | 1.9 | 7.1 | 3.7 |
| 4 | 20.2 | 2.8 | 2.0 | 9.8 | 4.9 |
| 5 | 20.1 | 2.8 | 1.9 | 2.4 | 1.3 |
| 6 | 19.8 | 3.0 | 2.0 | 2.8 | 1.4 |
| A | 20.0 | 3.2 | — | — | — |
| B | 19.7 | 3.1 | 2.1 | 2.2 | 1.0 |
| C | 20.0 | 2.8 | 2.0 | 10.6 | 5.3 |

For each of nine amorphous soft magnetic alloy ribbons in Table 1, one toroidal core having an outer diameter of 60 mm, an inner diameter of 25 mm and a height of 25 mm was prepared. With applying the direct current magnetic field of 800 A/m in the magnetic path direction of the core, the ribbons were heat treated for one hour at 550° C., which is the crystallization temperature, in the nitrogen atmosphere. The amorphous soft magnetic alloy ribbons in the magnetic cores were transformed into nano-crystalline soft magnetic alloy ribbons.

Table 2 shows the packing factor K and direct current magnetic characteristics for the nine toroidal cores completed. In Table 2, B80, Br and Hc are respectively the maximum magnetic flux density, residual magnetic flux density and coercive force, measured with considering the wave height of the direct current magnetizing force to be 80 A/m (same are applied to Example 2). While the samples 1 to 6 and comparative samples A and B have the same level direct current magnetic characteristics, comparative sample C has lower B80, Br, and Br/B80 and a higher Hc in direct current magnetic characteristics.

TABLE 2

| | Packing Factor K | B80(T) | Br(T) | Br/B80 | Hc (A/m) |
|---|---|---|---|---|---|
| 1 | 0.76 | 1.21 | 1.14 | 0.94 | 0.41 |
| 2 | 0.74 | 1.22 | 1.12 | 0.92 | 0.38 |
| 3 | 0.71 | 1.20 | 1.12 | 0.93 | 0.44 |
| 4 | 0.66 | 1.19 | 1.08 | 0.91 | 0.48 |
| 5 | 0.77 | 1.19 | 1.14 | 0.96 | 0.42 |
| 6 | 0.77 | 1.21 | 1.13 | 0.93 | 0.44 |
| A | 0.86 | 1.22 | 1.15 | 0.94 | 0.39 |
| B | 0.79 | 1.20 | 1.16 | 0.97 | 0.43 |
| C | 0.63 | 1.11 | 0.87 | 0.78 | 0.62 |

Each of the magnetic cores in Table 2 was used in the saturable reactor 16 in the magnetic characteristics measurement circuit during pulse voltage operation as shown in FIG. 1. Table 3 shows the results of measurement where the reset magnetizing force is 8 A/m and the period τ during which the magnetic flux density at the magnetic core during pulse voltage operation changes from 10 to 90% of the magnetic flux density swing ΔB is 0.05 μs.

In FIG. 1, the reference numeral 11 indicates an input direct current high voltage source, 12 is a charging resistor for a capacitor 15, 13 is a thyratron, 14 is inductance generated with wiring, 15 is a capacitor, 16 is a saturable reactor, 17 is a reactor for surge current absorption and 18 is a direct current power source to reset the saturable reactor 16.

In Table 3, ΔB is the magnetic flux density swing, K·ΔB is the effective magnetic flux density swing given as the product of the packing factor K and the magnetic flux density swing ΔB, μrs is the relative permeability in the saturation area, and Pcg is the core loss for a half cycle per unit volume (same are applied to Example 2).

TABLE 3

| | Packing Factor K | ΔB(T) | K · ΔB(T) | μrs | Pcg(J/m$^{-3}$) |
|---|---|---|---|---|---|
| 1 | 0.76 | 2.41 | 1.83 | 1.3 | 2590 |
| 2 | 0.74 | 2.39 | 1.77 | 1.2 | 2480 |
| 3 | 0.71 | 2.39 | 1.70 | 1.2 | 2410 |
| 4 | 0.66 | 2.38 | 1.57 | 1.2 | 2370 |
| 5 | 0.77 | 2.39 | 1.84 | 1.3 | 3360 |
| 6 | 0.77 | 2.40 | 1.85 | 1.3 | 3170 |
| A | 0.86 | 0.79 | 0.68 | — | 32000 |
| B | 0.79 | 2.42 | 1.91 | 1.5 | 3780 |
| C | 0.63 | 2.17 | 1.37 | 1.7 | 2680 |

Note: The period τ is 0.05 μs.

Referring to Table 3, it was difficult to calculate μrs of the saturation area for comparative sample A, because the core did not serve as a saturable reactor due to lack of layer insulation.

Figure 2:
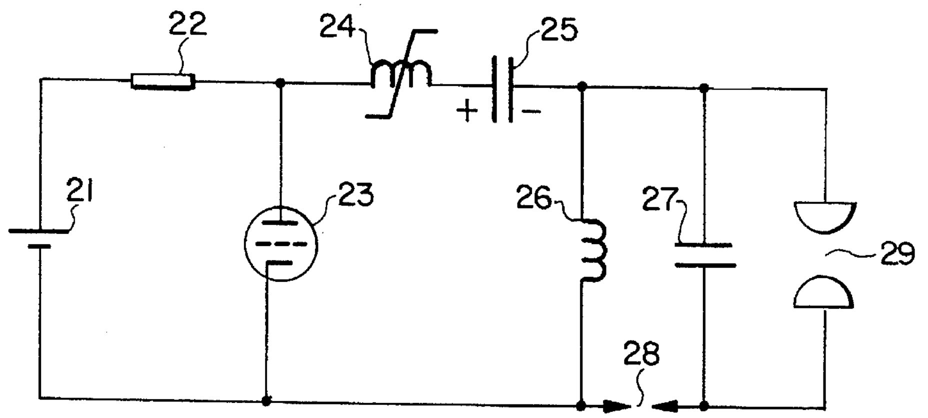
FIG. 2 is a schematic view to show the configuration of a KrF excimer laser excitation circuit using a saturable reactor for magnetic assist.

Each of eight cores of samples except sample A was mounted in the saturable reactor 24 for a KrF excimer laser with the circuit configuration as shown in FIG. 2. The laser was operated under high voltage pulse up to $10^6$ shots. In FIG. 2, the reference numeral 21 is an input high voltage direct current source, 22 is a charging resistor for a main capacitor 25, 23 is a thyratron, 24 is a saturable reactor for magnetic assist, 25 is a main capacitor, 26 is charging inductance for the main capacitor 25, 27 is a peaking capacitor, 28 is a ultraviolet light preliminary ionization gap and 29 is a main laser discharging electrode.

In the mounting test, the voltage of the input direct current high voltage source 21 was 20 kV, the main capacitor 25 and the peaking capacitor 27 had a capacitance of 20 nF and the effective length and interval of the main laser discharging electrode were 400 mm and 20 mm, respectively, and the repetition frequency was 500 Hz. The number of windings in the magnetic assist saturable reactor was 1, and the magnetic core was forcibly cooled down using silicone oil.

Then, the cores were used again in the saturable reactor 16 in the magnetic characteristics measurement circuit during pulse voltage operation as shown in FIG. 1. Measurement was made by the same method as above for the reset magnetization force of 8 A/m, and the period τ of 0.05 μs.

Table 4 shows compared data before and after the high voltage pulse applying test for the operation magnetic flux density swing ΔB, the relative permeability μrs in the saturation area and core loss Pcg for a half cycle per unit volume.

TABLE 4

| | Changing Ratio of ΔB (%) | Changing Ratio of μrs (%) | Changing Ratio of Pcg (%) |
|---|---|---|---|
| 1 | 0 | 0 | +3 |
| 2 | +1 | 0 | −1 |
| 3 | −2 | 0 | +2 |
| 4 | −2 | 0 | +2 |
| 5 | −4 | +2 | +5 |
| 6 | −3 | 0 | +4 |
| B | −13 | +10 | +16 |
| C | −11 | +10 | +12 |

As Table 4 shows, when using the magnetic cores of samples 1 to 6 for which the ratio dx/da is in the range from 1.2 to 5 and the maximum thickness dx is 10 μm or less, ΔB changes by −4% to +1%, μrs in the saturation area changes by 0 to +2%, Pcg for a half cycle per unit volume changes by −1 to +5%. Considering the measurement accuracy of ±5%, the magnetic characteristics are almost kept unchanged. In contrast, when using the magnetic cores of comparative samples B and C, whose dx/da is out of the above range, ΔB changes by −11% to −13%, μrs in the saturation area changes by +10%. Pcg for a half cycle per unit volume changes by +12% to +16%. The magnetic characteristics have been clearly changed for these, which means they are not preferable from the viewpoint of reliability.

EXAMPLE 2

By a single roller quenching method, same amorphous soft magnetic alloy ribbons as in Example 1 were prepared. By applying and drying the same coating liquid as in Example 1 on the surface, they were made into ribbons according to samples 7 to 12 of the present invention and comparative samples D, E and F as shown in Table 5. The ribbons of the present invention had an insulation coating for which the ratio dx/da was 3.0 and the average thickness was in the range from 0.1 to 4.5 μm. The ribbons of the comparative samples were provided with an insulation coating having an average thickness da of 4 μm or more, or a coating having the maximum thickness at the ribbon ends in the transverse direction of more than 10 μm.

TABLE 5

| | av. Thickness of Ribbons t(μm) | Surface Roughness Rz(μm) | av. Thickness of Coating da(μm) | Thickness at Coating Edges dx(μm) | dx/da |
|---|---|---|---|---|---|
| 7 | 20.0 | 3.0 | 0.1 | 0.3 | 3.0 |
| 8 | 20.1 | 2.8 | 0.2 | 0.6 | 3.0 |
| 9 | 20.2 | 2.9 | 0.5 | 1.5 | 3.0 |
| 10 | 19.8 | 3.1 | 1.0 | 3.0 | 3.0 |
| 11 | 20.3 | 3.0 | 2.0 | 6.0 | 3.0 |
| 12 | 20.0 | 2.8 | 3.0 | 9.0 | 3.0 |
| D | 20.2 | 2.9 | 3.5 | 10.5 | 3.0 |
| E | 19.9 | 3.1 | 4.0 | 12.5 | 3.0 |
| F | 20.1 | 3.2 | 4.5 | 13.5 | 3.0 |

For each of the above ribbons, one toroidal magnetic core was prepared. They are subjected same heat treatment as Example 1. The amorphous soft magnetic alloy ribbons were transformed into nano-crystalline soft magnetic alloy ribbons.

Table 6 shows the packing factor K and direct current magnetic characteristics of the nine toroidal cores completed. While samples 7 to 12 according to the present invention have the same level direct current magnetic characteristics, comparative samples D to F have lower B80, Br, and Br/B80 and a higher Hc in direct current magnetic characteristics.

TABLE 6

| | Packing Factor K | B80(T) | Br(T) | Br/B80 | Hc (A/m) |
|---|---|---|---|---|---|
| 7 | 0.84 | 1.22 | 1.15 | 0.94 | 0.38 |
| 8 | 0.82 | 1.22 | 1.13 | 0.93 | 0.38 |
| 9 | 0.79 | 1.22 | 1.11 | 0.91 | 0.40 |
| 10 | 0.75 | 1.22 | 1.11 | 0.91 | 0.41 |
| 11 | 0.68 | 1.20 | 1.10 | 0.92 | 0.45 |
| 12 | 0.62 | 1.19 | 1.09 | 0.92 | 0.44 |
| D | 0.59 | 1.18 | 0.92 | 0.78 | 0.66 |
| E | 0.57 | 1.16 | 0.87 | 0.75 | 0.65 |
| F | 0.55 | 1.13 | 0.82 | 0.73 | 0.72 |

Each of the magnetic cores in Table 6 was used in the saturable reactor 16 in the magnetic characteristics measurement circuit during pulse voltage operation as shown in FIG. 1. Tables 7 to 12 show the results of measurement where the reset magnetizing force is 8 A/m and the period τ during which the magnetic flux density at the magnetic core during pulse voltage operation changes from 10 to 90% of the magnetic flux density swing ΔB are 1, 0.5, 0.3, 0.2, 0.1 and 0.05 μs, respectively.

TABLE 7

| | Packing Factor K | ΔB(T) | K · ΔB(T) | μrs | Pcg(J/m$^{-3}$) |
|---|---|---|---|---|---|
| 7 | 0.84 | 2.37 | 1.99 | 1.9 | 983 |
| 8 | 0.82 | 2.40 | 1.97 | 1.2 | 583 |
| 9 | 0.79 | 2.39 | 1.89 | 1.2 | 591 |
| 10 | 0.75 | 2.39 | 1.79 | 1.2 | 577 |
| 11 | 0.68 | 2.39 | 1.63 | 1.2 | 581 |
| 12 | 0.62 | 2.38 | 1.48 | 1.2 | 571 |
| D | 0.59 | 2.21 | 1.30 | 1.6 | 578 |
| E | 0.57 | 2.18 | 1.24 | 1.8 | 657 |
| F | 0.55 | 2.17 | 1.19 | 1.7 | 722 |

Note: The period τ Is 1 μs.

TABLE 8

| | Packing Factor K | ΔB(T) | K · ΔB(T) | μrs | Pcg(J/m$^{-3}$) |
|---|---|---|---|---|---|
| 8 | 0.82 | 2.41 | 1.98 | 1.2 | 842 |
| 9 | 0.79 | 2.39 | 1.89 | 1.2 | 862 |
| 10 | 0.75 | 2.40 | 1.80 | 1.2 | 834 |
| 11 | 0.68 | 2.41 | 1.64 | 1.2 | 844 |
| 12 | 0.62 | 2.38 | 1.48 | 1.2 | 811 |
| D | 0.59 | 2.22 | 1.31 | 1.6 | 855 |
| E | 0.57 | 2.18 | 1.24 | 1.8 | 921 |
| F | 0.55 | 2.18 | 1.20 | 1.7 | 948 |

Note: The period τ is 0.5 μs.

TABLE 9

| | Packing Factor K | ΔB(T) | K · ΔB(T) | μrs | Pcg(J/m$^{-3}$) |
|---|---|---|---|---|---|
| 8 | 0.82 | 2.41 | 1.98 | 1.2 | 1150 |
| 9 | 0.79 | 2.39 | 1.89 | 1.2 | 1180 |
| 10 | 0.75 | 2.41 | 1.81 | 1.2 | 1100 |
| 11 | 0.68 | 2.41 | 1.64 | 1.2 | 1180 |
| 12 | 0.62 | 2.39 | 1.48 | 1.2 | 1030 |
| D | 0.59 | 2.23 | 1.32 | 1.6 | 1220 |
| E | 0.57 | 2.18 | 1.24 | 1.8 | 1360 |
| F | 0.55 | 2.19 | 1.21 | 1.7 | 1440 |

Note: The period τ is 0.3 μs.

TABLE 10

| | Packing Factor K | ΔB(T) | K · ΔB(T) | μrs | Pcg(J/m$^{-3}$) |
|---|---|---|---|---|---|
| 8 | 0.82 | 2.41 | 1.98 | 1.4 | 1730 |
| 9 | 0.79 | 2.40 | 1.90 | 1.2 | 1520 |
| 10 | 0.75 | 2.41 | 1.81 | 1.2 | 1490 |
| 11 | 0.68 | 2.41 | 1.64 | 1.2 | 1540 |
| 12 | 0.62 | 2.40 | 1.49 | 1.2 | 1380 |
| D | 0.59 | 2.23 | 1.32 | 1.6 | 1620 |
| E | 0.57 | 2.18 | 1.24 | 1.8 | 1760 |
| F | 0.55 | 2.19 | 1.21 | 1.7 | 1840 |

Note: The period τ is 0.2 μs.

TABLE 11

| | Packing Factor K | ΔB(T) | K · ΔB(T) | μrs | Pcg(J/m$^{-3}$) |
|---|---|---|---|---|---|
| 8 | 0.82 | 2.41 | 1.98 | 2.4 | 3030 |
| 9 | 0.79 | 2.40 | 1.90 | 1.2 | 2180 |

TABLE 11-continued

| | Packing Factor K | ΔB(T) | K · ΔB(T) | μrs | Pcg(J/m$^{-3}$) |
|---|---|---|---|---|---|
| 10 | 0.75 | 2.41 | 1.81 | 1.2 | 2040 |
| 11 | 0.68 | 2.41 | 1.64 | 1.2 | 2240 |
| 12 | 0.62 | 2.40 | 1.49 | 1.2 | 1890 |
| D | 0.59 | 2.23 | 1.32 | 1.6 | 2430 |
| E | 0.57 | 2.18 | 1.24 | 1.8 | 2610 |
| F | 0.55 | 2.19 | 1.21 | 1.7 | 2740 |

Note: The period τ is 0.1 μs.

TABLE 12

| | Packing Factor K | ΔB(T) | K · ΔB(T) | μrs | Pcg(J/m$^{-3}$) |
|---|---|---|---|---|---|
| 8 | 0.82 | 2.40 | 1.97 | 5.7 | 7210 |
| 9 | 0.79 | 2.40 | 1.90 | 1.5 | 2870 |
| 10 | 0.75 | 2.41 | 1.81 | 1.2 | 2610 |
| 11 | 0.68 | 2.41 | 1.64 | 1.2 | 2530 |
| 12 | 0.62 | 2.40 | 1.49 | 1.2 | 2300 |
| D | 0.59 | 2.23 | 1.32 | 1.6 | 2770 |
| E | 0.57 | 2.18 | 1.24 | 1.8 | 2890 |
| F | 0.55 | 2.19 | 1.21 | 1.7 | 2940 |

Note: The period τ is 0.05 μs.

It is clear from Table 7 that sample 7 of the present invention where the average thickness da of the insulation coating is 0.1 μm has only insufficient dielectric strength, therefore, during pulse voltage operation, μrs in the saturation area and Pcg for a half cycle per unit volume become less preferable.

For comparative samples D to F, a thick insulation coating formed on the magnetic ribbon causes excessive stress applied to the ribbon, which leads to a larger μrs in the saturation area and a larger Pcg for a half cycle per unit volume during pulse voltage operation than those in samples 8 to 12.

As Tables 10 to 12 show, sample 8 having the insulation coating with an average thickness da of 0.2 μm has an extremely larger μrs in the saturation area and Pcg for a half cycle per unit volume in comparison with sample 11 where the insulation coating has an average thickness da of 2 μm and sample 12 where the insulation coating has an average thickness da of 3 μm. Similarly, as shown in Table 12, when the period τ is 0.05 μs, sample 9 where the insulation coating has an average thickness da of 0.5 μm has larger μrs in the saturation area and Pcg for a half cycle per unit volume in comparison with samples 11 and 12.

Figure 3:
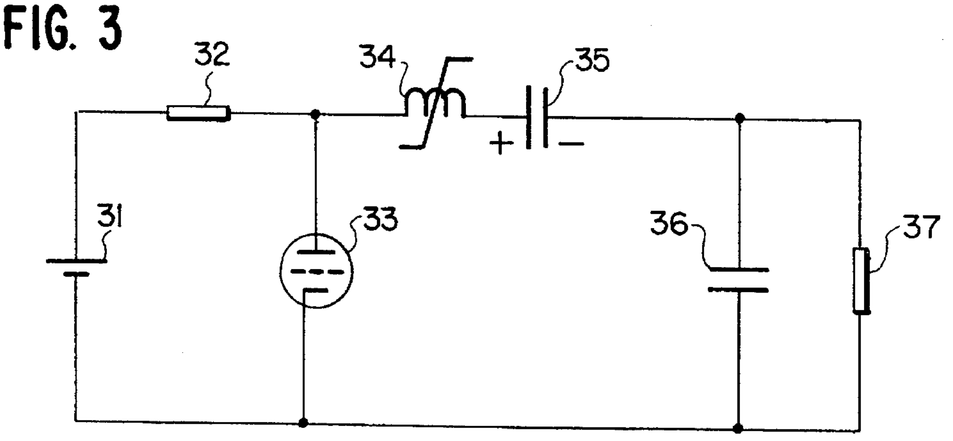
FIG. 3 is a schematic view to show the configuration of a high voltage pulse generator using magnetic assist circuit.

Each of the magnetic cores according to samples 8 to 12 was mounted in the saturable reactor 34 of a high voltage pulse generator with the circuit configuration as shown in FIG. 3, and subjected to application of high voltage pulse up to $10^6$ shots. Then, each of them was used again in the saturable reactor 16 in the magnetic characteristics circuit during pulse voltage operation as shown in FIG. 1. Measurement was made by the same method as in Example 1 for the reset magnetizing force of 8 A/m, and the period τ of 0.05 μs.

In FIG. 3, the reference numeral 31 indicates an input high voltage direct current source, 32 is a charging resistor of a main capacitor 35, 33 is a thyratron, 34 is a saturable reactor for magnetic assist, 35 is a main capacitor, 36 is a peaking capacitor and 37 is a load resistor.

In the mounting test with a high voltage pulse generator, the period τ was set based on the results in Tables 7 to 12 above so as to be the minimum value in the range where the relative permeability μrs in the saturation area of the magnetic core does not begin extraordinary increase during pulse voltage operation.

In Table 13, τ0 indicates the period set for each sample during which the magnetic flux density of the core changes from 10 to 90% of the magnetic flux density swing ΔB. Table 13 further contains the compared data for ΔB, μrs in the saturation area and Pcg for a half cycle per unit area before and after the test applying high voltage pulse.

TABLE 13

| | τ0 (μs) | Changing Ratio of ΔB (%) | Changing Ratio of μrs (%) | Changing Ratio of Pcg (%) |
|---|---|---|---|---|
| 8 | 0.24 | −2 | 0 | +4 |
| 9 | 0.10 | −1 | 0 | +1 |
| 10 | 0.05 | −3 | 0 | +3 |
| 11 | 0.05 | +1 | 0 | +2 |
| 12 | 0.05 | −3 | 0 | +1 |

As is clear from Table 13, for the magnetic cores of the present invention, ΔB changes by −3% to +1% and Pcg for a half cycle per unit volume changes by +1% to +4%. Considering the measurement accuracy of ±5%, the magnetic characteristics are almost kept unchanged.

From the above results, a magnetic core comprising a nano-crystalline soft magnetic alloy ribbon with thickness t, width W and magnetic flux density swing ΔB, has stability with time corresponding to the magnetization speed ΔB/τ during pulse voltage operation if the period τ and the average thickness da of the ceramic insulation coating formed on the ribbon surface satisfy the following formula. Magnetic components using such a magnetic core can be made more reliable.

Formula: $da \geqq (40\times10^{-9}\cdot\Delta B\cdot W\cdot t)/\tau(m)$

Examples 1 and 2 above have described application of a nano-crystalline soft magnetic alloy ribbon with composition of $Fe_{73.5}Cu_1Nb_3Si_{13.5}B_9$ having an $SiO_2$ insulation coating thereon to the magnetic core of a magnetic assist saturable reactor used in high voltage pulse generators for excimer laser or other units. Obviously, with combination of ceramic insulation coating or different composition and nano-crystalline soft magnetic alloy ribbon of different composition, the same effect can be realized if the present invention is applied to such a nano-crystalline soft magnetic alloy ribbon and a magnetic core comprising such a ribbon, which is used in magnetic components for other applications such as transformer, saturable transformer, acceleration cavity and surge block core.

The present invention can thus realize both high reliability and superior performance for laser units including excimer laser, TEA-$CO_2$ laser, TEMA-$CO_2$ laser or copper vapor laser and accelerators such as a linear induction accelerator as well as a neutral beam injector.

What is claimed is:

1. A nano-crystalline soft magnetic alloy ribbon having nano-crystalline particles of an average particle size of 50 nm or less occupying at least 50% of the alloy structure, the surface of the ribbon having a ceramic insulation coating which is thicker at each end than the center, in the transverse direction of the ribbon, wherein the thickness (dx) of the insulation coating at the ends of the ribbon and the average thickness (da) of the insulation coating determined by a mass measurement method have relations of 1.2 (da)≦(dx)≦5 (da) and (dx)≦10 μm.

2. A nano-crystalline soft magnetic alloy ribbon of claim 1 wherein the average thickness (da) of the ceramic insulation coating determined by a mass measurement method is in a range satisfying 0.2 μm≦(da)≦4 μm and (da)≧(40×

$10^{-9}\cdot\Delta B\cdot W\cdot t)/\tau$ when average thickness t of the ribbon determined by a mass measurement method is 5 $\mu m \leqq t \leqq 30$ $\mu m$, the ribbon width is W, magnetic flux density swing is $\Delta B$, and period during which the above magnetic flux density swing $\Delta B$ changes from 10 to 90% is $\tau$.

3. A nano-crystalline soft magnetic alloy ribbon of claim 1 or 2 comprising Fe as the main constituent, at least either one of Cu and Au and at least one of Ti, V, Zr, Nb, Mo, Hf, Ta and W.

4. A magnetic core comprising a nano-crystalline soft magnetic alloy ribbon according to one of claims 1 or 2.

5. A pulse generator incorporating the magnetic core according to claim 4.

6. A laser unit incorporating the magnetic core according to claim 4.

7. An accelerator incorporating the magnetic core according to claim 4.

8. A surge absorbing element for an ion source incorporating the magnetic core according to claim 4.

9. A magnetic core comprising a nano-crystalline soft magnetic alloy ribbon according to claim 3.

10. A pulse generator incorporating the magnetic core according to claim 9.

11. A laser unit incorporating the magnetic core according to claim 9.

12. An accelerator incorporating the magnetic core according to claim 9.

13. A surge absorbing element for an ion source incorporating the magnetic core according to claim 9.

* * * * *